United States Patent [19]
Dageford

[11] 3,742,303
[45] June 26, 1973

[54] COMPRESSOR PROTECTOR SYSTEM

[75] Inventor: Ernest C. Dageford, Irvine, Calif.

[73] Assignee: BEC Products, Inc., Davenport, Iowa

[22] Filed: Nov. 8, 1971

[21] Appl. No.: 196,603

[52] U.S. Cl. ............ 317/13 A, 317/33 SC, 317/22, 317/13 B, 317/36 TD, 317/27 R
[51] Int. Cl. ............................................. H02h 7/08
[58] Field of Search ............ 317/13 A, 13 B, 13 C, 317/22, 14 C, 27 R, 13 R, 36 TD, 33 SC; 322/24; 318/454; 307/235; 62/230

[56] References Cited
UNITED STATES PATENTS

| | | | |
|---|---|---|---|
| 3,417,290 | 12/1968 | Craddock | 318/454 |
| 3,585,451 | 6/1971 | Day | 317/13 C |
| 3,544,983 | 12/1970 | Wallace | 307/235 |
| 3,407,338 | 10/1968 | Secunde | 317/36 TD |
| 3,526,809 | 9/1970 | Obenhaus | 317/13 B |

*Primary Examiner*—J. D. Miller
*Assistant Examiner*—Harvey Fendelman
*Attorney*—George F. Smyth et al.

[57] ABSTRACT

A compressor protector system for externally monitoring the internal temperature of a compressor motor by monitoring the level of the current supplied to the motor and for discontinuing the supply of voltage to the motor when the current level is above or below a desired range of levels for a predetermined period of time. The compressor protector system may also directly monitor high temperature conditions within the compressor and a single phasing condition of the three-phase supply to the compressor motor so as to discontinue the supply of voltage under such high temperature or single phasing conditions. The compressor protector system automatically rechecks after a predetermined period of time to determine if the particular fault which resulted in a continuing of the voltage supply has cleared and then automatically restarts the compressor if the fault has cleared. The system also prevents short cycling in that once the compressor has been turned off it cannot be restarted until after a predetermined period of time.

10 Claims, 2 Drawing Figures

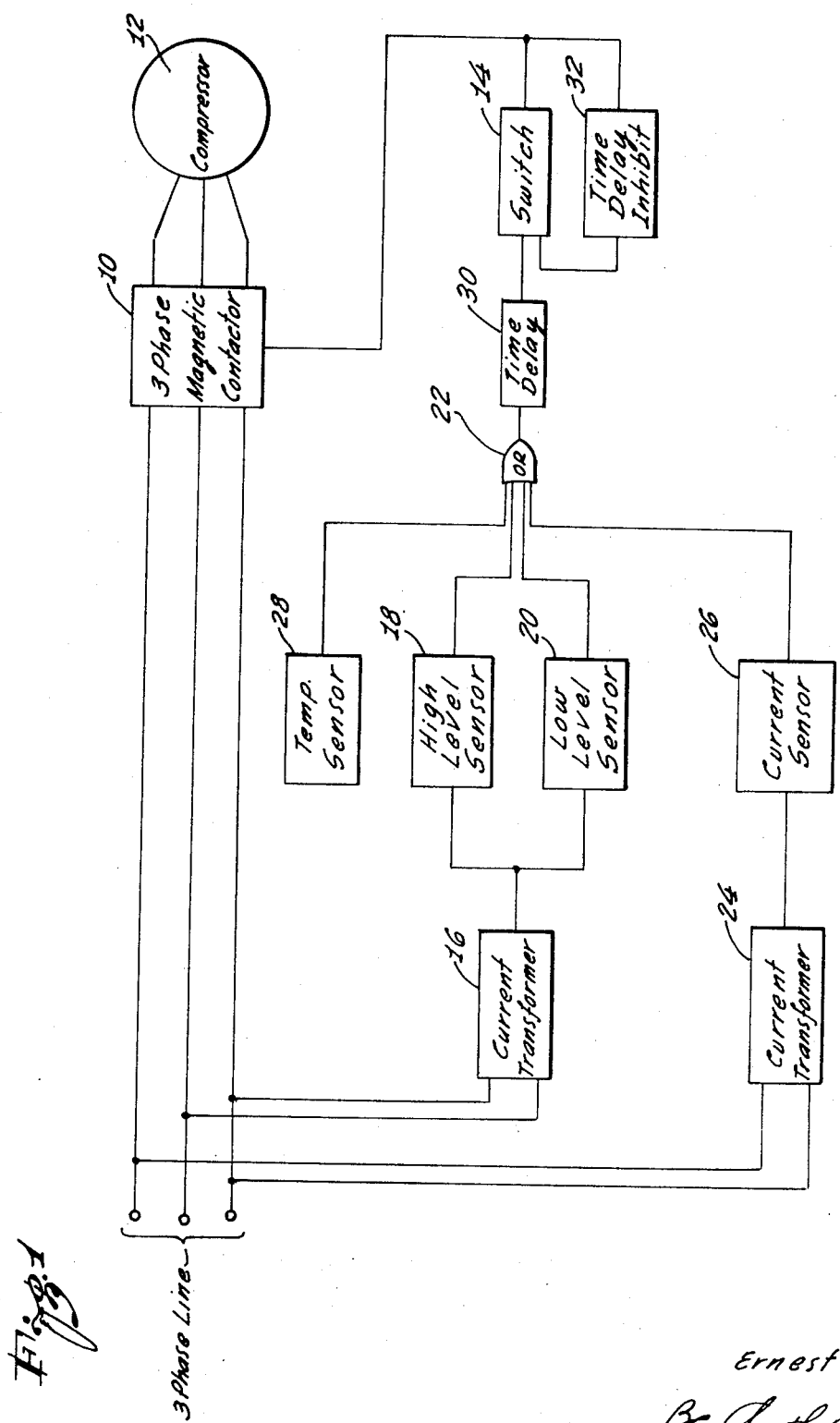

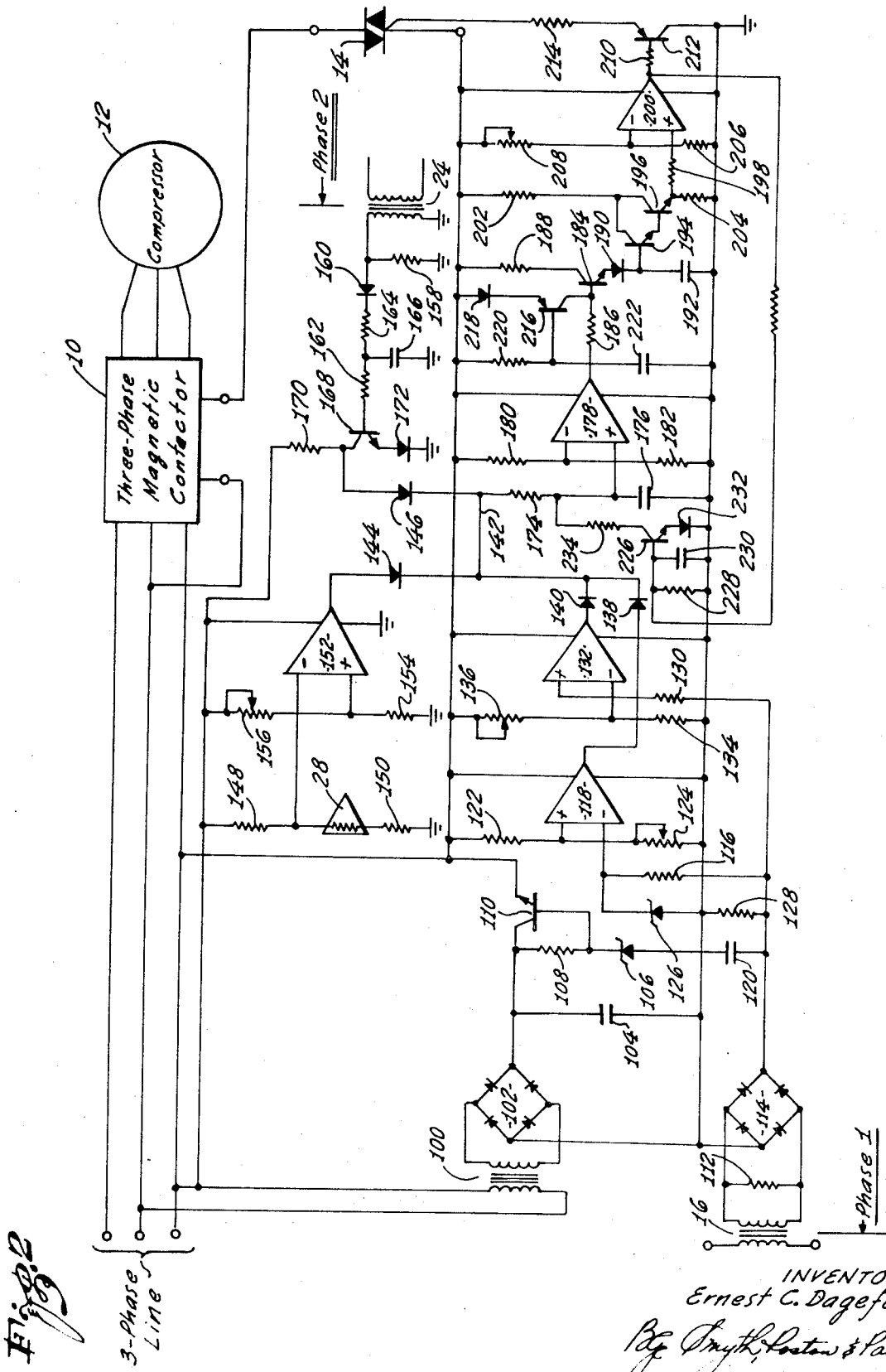

COMPRESSOR PROTECTOR SYSTEM

The present invention is directed to a compressor protector system for discontinuing the supply of voltage to the motor of a compressor under certain particular conditions. Generally, it is desirable to protect the motor of a compressor from a number of different faults which may result in a damaging of the motor. For example, the rotor may become locked in position. The internal friction of the motor may increase thereby reducing the revolutions per minute of the motor. The external load of the motor may become excessive or there may be an electrical short within the motor. Any of these faults, if allowed to continue, would within a relatively short period of time result in the motor burning up rapidly.

The various faults outlined above usually provide for the current drawn by the motor to rise to a high level. Therefore, it is possible to monitor these various faults by monitoring the current supplied to the motor and for discontinuing the supply of voltage to the motor when the current becomes excessive. Generally, the excessive current indicates that these various faults are providing for an excessive temperature condition within the motor.

Unfortunately, a high temperature condition within the motor may not necessarily result from a fault which produces a high current to the motor. A low current to the motor may also represent a fault in the compressor system. For example, if the refrigerant supplied to the motor were too warm or were volumetrically inadequate, this would provide for the motor drawing a lower current since the resistance of the motor windings would be increased. Even though the motor is drawing a lower current, the motor would actually experience a rise in temperature. Specifically, as the current would be decreasing, the motor temperature would be increasing, which would cause a further increase of the resistance of the motor windings. Eventually the motor would burn up due to this increasing temperature even though the current input to the motor was decreasing. Generally, any fault which would cause inadequate cooling to the motor, such as a leak in the refrigerant or a bad evaporator would produce this low current condition.

As a further protection of the compressor protector system of the present invention, a temperature sensor may be placed to detect the actual temperature of the motor, such as the oil temperature in the compressor motor or the temperature of the exhaust gas from the compressor or the temperature of the suction gas to the compressor. When this temperature is too high, the voltage supply to the compressor motor should be discontinued. Although this detection of temperature is not completely necessary since the monitoring of high and low current would generally detect the same faults as would be detected by the monitoring of temperature, the monitoring of temperature may provide a safety factor.

As an additional area of monitoring with a three phase voltage supply, a check may be made to ensure that the motor is being supplied with a three-phase supply. For example, one line of the three-phase supply may be discontinued, which results in a condition called "single phasing." Such a condition can produce damage to the compressor motor and it is advisable to detect such single phasing.

Another difficulty that occurs with the operation of compressor systems is a condition called "short cycling." Short cycling occurs when the motor is turned on shortly after having been turned off. At this time, the pressure at the output of the compressor is high since there has not been sufficient time to have this output pressure decrease by a diffusion through the compressor. When the motor is turned on and the output pressure is high, this may cause the motor to go into a locked rotor condition which, as indicated above, produces a very high current which would rapidly burn up the motor. In order to prevent this short cycling, the compressor protection system of the present invention includes a delay of a predetermined time period to ensure that the motor cannot be turned on until after a predetermined time has occurred after the motor has been turned off. For example, the power to the motor may be inhibited for a period such as fifteen minutes after the compressor has been turned off, so that there is a sufficient period of time for the output pressure to lower itself by diffusion.

The present invention has particular advantages in providing for a compressor protector system. Generally, the present invention senses the internal temperature of the compressor by externally monitoring the current to the motor. This eliminates the need for providing sensing devices within the motor as is common in the prior art. The present invention is current sensing and not voltage sensing since the voltage from the supply generally remains constant. It is to be appreciated, however, that as a further protection it would be possible to monitor high and low voltage from the supply so as to prevent any injury to the compressor due to such high or low voltage. The present invention is also anti-short cycling and also senses single phasing. In addition, it is possible to provide for a direct temperature sensing through the use of a temperature sensing device such as a thermistor. Generally, however, the present invention is external to the compressor unit so that if a fault occurs in the protection system itself it is not necessary to tear down the compressor to correct the fault in the protection system.

A clearer understanding of the system will be had with reference to the following description and drawing wherein:

FIG. 1 illustrates in block diagram form the compressor protector system of the present invention; and FIG. 2 illustrates a schematic of a particular circuit for the compressor protector system of FIG. 1.

The compressor protector system of FIG. 1 operates to control the application of three-phase power through a three-phase magnetic contactor 10 to a compressor 12. Assuming that the three-phase magnetic contactor 10 has been controlled to be in a position to apply the three-phase line power to the compressor 12, the magnetic contactor 10 may be controlled to discontinue the application of power to the compressor 12, in the following manner:

A first current transformer 16 monitors the current supplied by one phase of the three-phase power supply. The output from the current transformer is applied to a pair of sensors 18 and 20 with sensor 18 forming a high-level sensor and sensor 20 forming a low-level sensor. As long as the current is within a predetermined range, as determined by the levels at which the high and low-level sensors 18 and 20 operate, no output signal is produced by either of the sensors. If the current is over a predetermined level, the high-level sensor 18 produces an output signal to the OR gate 22. If the current is below a particular level, the low-level sensor 20 produces an output signal to the OR gate 22.

A second current transformer 24 monitors another one of the phases of the three-phase line. When any of the phases other than the phase applied to the current transformer 12 is disconnected for some reason, the current transformer 24 no longer produces an output signal to a current sensor 26. As long as there is current to the current transformer 24, the current sensor 26 does not produce an output signal. However, when current is discontinued to the current transformer 24, the current sensor 26 produces an output signal which is applied to the OR gate 22.

A temperature sensor 28 may be positioned at various places within the compressor system. For example, the temperature sensor may be positioned to monitor the temperature of the compressor such as the oil temperature of the compressor motor or may be used to monitor the exhaust gas temperature from the compressor or the suction gas temperature to the compressor. Depending upon the particular position of the temperature sensor 28, a level is chosen and when the tmperature is above that level the temperature sensor 28 produces an output signal which is applied to the OR gate 22.

Any of the inputs to the OR gate 22 provides for a control signal from the OR gate. This control signal is applied through a time delay 30 to control the switch 14. The time delay 30 may have a short time delay such as 3 to 5 seconds to ensure that if a fault does occur, it is not a temporary fault which quickly corrects itself. Therefore, the fault must exist for a period such as 3 to 5 seconds before the signal from the OR gate 22 will be used to control the switch 14. If the fault does not continue for a period such as 3 to 5 seconds, then the switch 14 is not controlled to disconnect the power to the compressor 12 by opening the magnetic contactor 10.

When the switch 14 is controlled to discontinue power to the compressor 12, a time delay inhibit circuit 32 is also activated so that the switch 14 maintains the discontinuance of power to the compressor 12 for a predetermined period of time as determined by the time delay inhibit circuit 32. For example, in order to prevent "short cycling" which may result in a locked rotor condition the inhibit circuit 32 ensures that compressor 12 will not be turned off by the control signal from the OR gate 22 and then quickly turned on. The time delay inhibit circuit 32 may provide for the inhibiting of power to the compressor 12 for a period such as 15 minutes. This allows a sufficient time for the output pressure of the compressor to diffuse to a lower value through the compressor so as to eliminate the possibility of the locked rotor condition.

FIG. 2 illustrates a schematic of a particular circuit which may be used to accomplish the results of the system shown in FIG. 1. In FIG. 2, elements similar to those in FIG. 1 are given similar reference characters. It can be seen in FIG. 2 that three-phase power is applied through a three-phase magnetic contactor 10 to the compressor 12.

A stepdown transformer 100 receives power from one phase of the three-phase power supply and provides the stepdown voltage to a bridge rectifier 102. The d-c output from the bridge rectifier is filtered by capacitor 104 and is supplied across a regulating circuit including a Zener diode 106, a resistor 108 and a power transistor 110. The power transistor 110 is used as a series voltage regulator having its bias controlled by the Zener diode 106.

The current transformer 16 is coupled across one leg of the three-phase power supply to monitor the current supplied to the compressor 12. The output from the current transformer 16 is applied across a resistor 112 which operates as a load to adjust the range of the current transformer and with the output of the current transformer then applied to the bridge rectifier 114. The bridge rectifier rectifies the current and provides a d-c output voltage proportional to the current monitored by the current transformer 16.

The output from the bridge rectifier 114 is applied through a current-limiting resistor 116 to one input to a differential comparator 118. A capacitor 120 is used to filter the output of the rectifier 114 to eliminate any unwanted signals.

The differential comparator 118 may be formed from an operational amplifier having one side biased by a voltage divider including resistor 122 and rheostat 124 and with such biased operational amplifier thereby acting as a differential comparator. In order to prevent damage to the operational amplifier if the input from the bridge rectifier is excessive, a Zener diode 126 is used as a clipper. A resistor 128 is used to limit the current to the Zener diode 126 when in a state of conduction.

The voltage divider including the resistor 122 and the rheostat 124 may be adjusted so as to set the level at which the differential comparator 118 operates. Specifically, differential comparator 118 operates as a low-level detector in that when the voltage from the bridge rectifier 114 is less than the voltage from the voltage divider including the resistor 122 and rheostat 124, an output from the differential comparator is produced. Therefore, as long as the voltage from the rectifier 114 is above the voltage from the voltage divider, there is no output from the differential comparator 118.

The output from the rectifier 114 is also supplied through current-limiting resistor 130 to one input to a second differential comparator 132. Again, the differential comparator 132 may be an operational amplifier having one input biased by an output from a voltage divider including resistor 134 and rheostat 136. The rheostat 136 may be adjusted so as to set the high level sensing. When the voltage from the rectifier 114 is greater than the voltage from the voltage divider including resistor 134 and rheostat 136, the differential comparator 132 produces an output signal. Therefore, as long as the current supplied to the current transformer 16 is within a predetermined range as determined by the high-and low-level sensors, there is no output signal from either of the differential comparators 118 and 132. When the current is above or below this range, then either of the differential comparators 118 or 132 may produce an output signal.

The output signals from the differential comparators 118 and 132 are applied to diodes 138 and 140, which diodes form a part of the OR gate 22 shown in FIG. 1. The output from the diodes 138 and 140 is connected to a common line 142. The other two inputs to the common line 142 are through diodes 144 and 146 and the four diodes 138, 140, 142 and 146 form the complete OR gate 22. When any of the diodes 138, 140, 144 and 146 are in conduction, then a signal appears on the common line 142 to ultimately provide for the magnetic contactor 10 discontinuing the application of power to the compressor 12. The other inputs to the OR gate, which are the inputs to control the diodes 144 and 146, will now be described.

The temperature sensor 28, such as a thermistor, may be located to sense the temperature of the compressor at a number of different locations. For example, the temperature sensor 28 may be positioned to sense the temperature of the exhaust gas from the compressor or the temperature of the suction gas to the compressor. In addition, the temperature sensor 28 may be placed to sense the oil temperature of the motor in the compressor. The specific location is not important but merely that the temperature sensor 28 is positioned to sense the temperature at a particular location, which temperature should have a particular desired value. When the temperature exceeds that value, then the temperature sensor senses this increase by a change of resistance.

A voltage divider including resistors 148 and 150 in combination with the temperature sensor 28, supplies a voltage to one input to a differential comparator 152. As the temperature changes, the resistance of the temperature sensor 28 changes, thereby providing a change to the input of the differential comparator 152. The differential comparator 152 also receives a second input from a voltage divider including resistor 154 and a rheostat 156 which allows the voltage divider to be adjusted. The differential comparator 152 essentially operates as a low-level sensor. Generally, if the temperature sensor 28 is a thermistor, an increase in temperature will produce a decrease in the voltage applied to the differential comparator 152. Therefore, the differential comparator is set up as a low-level sensor to detect this inverse relationship. When the temperature increases past a desired level, the differential comparator 152 produces an output signal which is applied to the common line 142 through the diode 144.

The current transformer 24 monitors single phasing in the three-phase power supply. The output from the current transformer is applied across a load provided by the resistor 158, which load resistor 158 adjusts the range of the current transformer 24. Essentially, the current transformer 24 is used to detect the presence or absence of current. When there is current, then this current produces an output from the transformer 24 which is rectified by the diode 160 and applied through a filter formed by resistors 162 and 164 and capacitor 166 to the base of the transistor 168. A resistor 170 and diode 172 form part of the load and bias circuit for the transistor 168.

When the current transformer 24 detects the presence of current then the transistor 168 is in conduction and the diode 172 bypasses any current so that the input to the diode 146 is low. If there is no current to the transformer 24, then the transistor 168 is not turned on and the voltage is high to the diode 146 to produce a signal on the line 142.

It can now be seen that the OR gate, including diodes 138, 140, 144 and 146 produces a signal on the line 142 when any of the four following conditions occur: a high or low current outside of the normal range of currents that should be supplied to the compressor 12; a high temperature at some particular location in the compressor system 12; and a single phasing condition in the three-phase supply to the compressor 12.

When any of the above described faults occur and a signal is present on the line 142, then this signal is applied to an r-c circuit including resistor 174 and capacitor 176 which forms a time delay circuit; for example, the time delay may be for a period such as 3 to 5 seconds. This time delay ensures that the fault must persist for a predetermined period of time such as 3 to 5 seconds. This time delay eliminates momentary fault conditions or surges on the line which are not sufficient to damage the compressor since they do not last for a sufficient period of time, such as in excess of 3 to 5 seconds.

The output of the r-c circuit is applied as one input to a differential comparator 178. The other input to the differential comparator is formed by a voltage divider including resistors 180 and 182. The differential comparator 178, therefore, forms a high-level sensor and when the input to the time delay is for a sufficient length of time, such as in excess of 3 to 5 seconds, then the voltage across the capacitor 176 rises sufficiently to produce an output from the differential comparator 178.

The output from the differential comparator 178 is applied to the base of the transistor 184 through a current limiting resistor 186 and when the differential comparator 178 produces an output, then the transistor 184 is turned on. The transistor 184 has a small load formed by a resistor 188 and a low-leakage diode 190 and a capacitor 192 are part of the emitter circuit. When the transistor 184 is turned on, then the capacitor 192 is charged to the full d-c level very rapidly.

The output signal across the capacitor 192 is connected to a pair of transistors 194 and 196 which are Darlington coupled to provide a high beta. When the capacitor 192 is charged, this output appear almost simultaneously at the output of the transistor 196 and is applied through a resistor 198 to form one input to a differential comparator 200. A resistor 202 forms a small load for the Darlington-coupled transistors 194 and 196 and a resistor 204 is used to give high impedance in combination with the Darlington-coupled transistors 194 and 196.

The use of the low-leakage diode 190 and the Darlington-coupled transistors 194 and 196 provides a very high impedance discharge path for the capacitor 192. Therefore, the capacitor 192 when charged takes a very long time, such as 15 minutes to discharge, due to the low-leakage diode 190 and the high beta of the Darlington-coupled transistors. When the transistor 184 is turned off, the capacitor 192 is still charged and the long discharge time operates as a long time delay to inhibit the compressor motor 12 from being turned on immediately after being turned off. In addition, as will be seen shortly, the use of this long time delay acts as an automatic restart after this long time delay, such as 15 minutes, so as to retest if the fault has cleared after the long time delay such as 15 minutes. Therefore, every 15 minutes the system rechecks to see if the fault has cleared.

The differential comparator 200 also receives as a second input an output from a voltage divider including a resistor 206 and a rheostat 208. Normally the input from the voltage divider is higher than the input from the Darlington-coupled transistors, but when the capacitor 192 charges in response to a fault, then the input to the differential comparator from the Darlington-coupled transistor is greater than that from the voltage divider to provide an output from the differential comparator 200. The output from the differential comparator 200 is applied through a current-limiting resistor 210 to a transistor 212. The transistor 212 controls the triac switch 14 through the resistor 214.

The transistor 212 is normally on and is turned off when the differential comparator 200 produces an output signal. When the transistor 212 is turned off, this turns off the triac 14 which in turn turns off the magnetic contactor 10. It can be seen, therefore, that if a fault occurs for a period of time greater than 3 to 5 seconds, the triac switch 14 is turned off to turn off the magnetic contactor 10. In addition, even if the fault clears after this 3 to 5 second period, the slow discharge path for the capacitor 192 prevents the compressor motor from being restarted until after a long period of time such as 15 minutes so as to prevent short cycling, which may cause a locked rotor to thereby burn up the motor.

The system of FIG. 2 also includes two inhibit circuits to further safeguard the compressor. For example, when power is initially applied to the system, such as when a thermostat calls for cooling, this power immediately produces a d-c voltage from the bridge 102 which is applied to a transistor 216 through the diode 218. The transistor 216 turns on to turn on transistor 184 to charge capacitor 192. In addition, an r-c circuit including resistor 220 and capacitor 222 charges up the capacitor 222 to quickly turn off the transistor 216. However, before transistor 216 is turned off to thereby turn off transistor 184, capacitor 192 has already charged up so as to provide for a time delay of the long period such as 15 minutes before the compressor motor is turned on. This again prevents short cycling so that whenever power is initially applied to the compressor protector circuit there is a time delay of a relatively long period of time to allow any high pressure to diffuse through the compressor.

The output from the differential comparator 200 is also applied through a filter resistor 224 to the base of a transistor 226. A resistor 228 and a capacitor 230 provide for a filtered input to the base of the transistor 226. A diode 232 is used to lift the voltage of the transistor 226 to equal that of the output of the differential comparator 178. A resistor 234 couples the transistor across the capacitor 176 so that when the transistor 226, which is normally off, receives a signal from the output of the comparator 200, it turns on to discharge the capacitor 176.

The discharging of the capacitor 176 is necessary so that when the long-time delay such as the 15 minute period is over, the system can recheck to see if the fault has still persisted. If the capacitor 176 were not discharged, then there would never be a recheck. Even if the fault had cleared, the capacitor 176 would still be charged because when the compressor 12 is turned off, it would appear to the compressor protection system that there was a low current condition which would maintain the capacitor 176 in charged condition. In addition, since no current would be drawn, this would also appear as if the power supply was in a single phasing condition. Therefore, it is necessary to discharge the capacitor 176 so that the system could be rechecked at the end of the long time period such as 15 minutes.

The general operation and sequence of the compressor protector of the present invention is as follows. Normally the power is turned on and the thermostat calls for cooling so that the power is turned on. After the power is turned on, the compressor is inhibited for the long time period such as 15 minutes in order to ensure that there is no short cycling. After the time period such as 15 minutes, the compressor is turned on and the compressor must be at the proper operating conditions before the end of the 3 to 5 second time period. If the compressor is normally operating, this 3 to 5 second time period is sufficient to ensure the proper operating conditions. As the compressor operates, the compressor protection system senses the following conditions which represent a number of faults, as described in the beginning portion of this specification. The conditions that are sensed are high and low current, high temperature and single phasing. If any of these conditions occurs and persists for a period such as 3 to 5 seconds, then the compressor is turned off. After a predetermined period of time such as 15 minutes, the compressor is restarted to see if the fault has cleared. This checking occurs continuously every 15 minutes.

The compressor protector system therefore provides for a complete protection of a compressor using an external monitoring circuit. Basically, the system senses the internal temperature which may represent a number of different internal faults by externally monitoring the current. The internal temperature may be rising when there is either an excessive current or a very low current so that the monitoring allows for a particular range of current which represents normal operation. The system also protects against short cycling and, in addition, may sense an actual temperature condition by the placing of a temperature sensor at a desired location. Although the present invention has been described with reference to a particular embodiment, it is only to be limited by the appended claims.

What is claimed is:

1. A compressor protector system for externally monitoring a compressor coupled to a source of voltage, including first means coupled to the source of voltage for monitoring the current supplied to the compressor by the source of voltage, second means coupled to the first means for sensing the level of the current supplied to the compressor and for providing a first control signal when the level of the current is greater than a first predetermined level and for providing a second control signal when the level of the current is less than a second predetermined level and with the first and second predetermined levels forming the extremes of a normal range of current supplied to the compressor, third means responsive to the first and second control signals for controlling the coupling and decoupling the source of voltage to the compressor and with the third means controlling the decoupling of the voltage in response to either the first or second control signals, fourth means coupled to the third means for inhibiting the coupling of the source of voltage to the compressor for a predetermined period of time after the third means has decoupled the voltage in response to either the first or second control signals, and fifth means coupled to the fourth means for controlling the fifth means to inhibit the coupling of the source of voltage to the compressor for a predetermined period of time after electrical energy is initially supplied to the compressor protector system.

2. The compressor protector system of claim 1 additionally including sixth means for sensing the temperature of a portion of the compressor and for producing a third control signal when the temperature is above a predetermined level and with the third means responsive to the third control signal to decouple the source of voltage in response to the third control signal.

3. The compressor protector system of claim 1 wherein the source of voltage is three phase and additionally including sixth means responsive to the three phase source of voltage for detecting a single phasing condition and for producing a third control signal in response to such single phasing condition and with the third means responsive to the third control signal to decouple the source of voltage in response to the third control signal.

4. The compressor protector system of claim 1 wherein the third means includes a timing circuit providing a predetermined timing period to inhibit the decoupling of the source of voltage until either the first or second control signal persists for a period of time greater than the predetermined timing period.

5. A motor protector for externally monitoring the internal temperature of a motor supplied by a source of voltage, including first means coupled to the source of voltage for monitoring the level of current supplied by the source of voltage to the motor, second means coupled to the first means and responsive to the current level for providing a control signal when the current level is not at a desired level, third means coupled to the second means and responsive to the control signal for inhibiting the supply of the source of voltage to the motor in response to the control signal, fourth means coupled to the third means for preventing the supply of the source of voltage to the motor for a predetermined period of time after the third means has inhibited the supply of voltage in response to the control signals, and fifth means coupled to the fourth means to control the fourth means to prevent the supply of the source of voltage to the motor for a predetermined period of time after electrical energy is initially supplied to the motor protector.

6. The motor protector of claim 5 wherein the desired current level includes a range of values and with the control signal produced by the second means in accordance with the current level above or below the range of values.

7. The motor protector of claim 7 wherein the motor forms part of a compressor system additionally including sixth means for sensing the temperature of a portion of the compressor and with the second means producing the control signal when the temperature is above a predetermined level.

8. The motor protector of claim 5 wherein the source of voltage is three phase and additionally including sixth means responsive to the three phase source of voltage for detecting a single phasing condition and with the second means producing the control signal in response to such single phasing condition.

9. The motor protector of claim 5 wherein the third means includes a timing circuit providing a predetermined timing period to prevent the inhibiting of the source of voltage until the control signal persists for a period of time greater than the predetermined timing period.

10. A compressor protector system for use with a source of power coupled to the compressor through a switch, including first means for monitoring the level of the current supplied by the source of power to the compressor and for producing an output signal when the current level is different than a predetermined level, second means coupled to the first means and responsive to the output signal for providing a control signal after the output signal has lasted for a first predetermined period of time, third means coupled to the second means and responsive to the control signal for controlling the switch to discontinue the coupling of the source of power to the compressor upon receipt of the control signal, fourth means for inhibiting the third means controlling the switch to recouple the source of power for the compressor until a predetermined period of time after the third means has discontinued the coupling, and fifth means controlling the fourth means to inhibit the coupling upon the initial application of power to the compressor protector system.

* * * * *